July 15, 1952     C. GADD-CLAXTON     2,602,941
DEVICE FOR THE MANUFACTURE OF HONEYCOMBS
Filed Sept. 10, 1947     2 SHEETS—SHEET 2

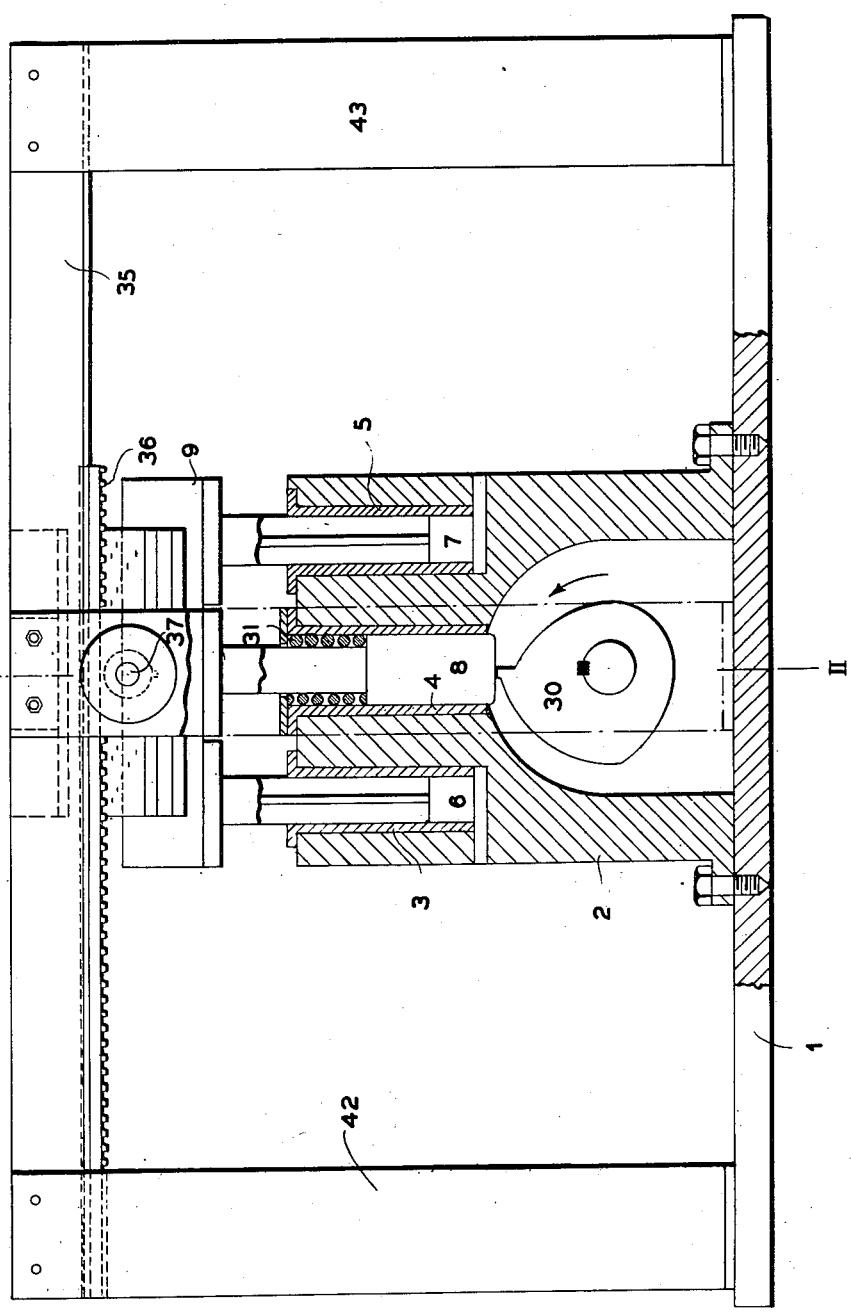

INVENTOR
CLAUDE GADD CLAXTON
By Robert H. Jacob
HIS AGENT

Patented July 15, 1952

2,602,941

UNITED STATES PATENT OFFICE 2,602,941

DEVICE FOR THE MANUFACTURE OF HONEYCOMBS

Claude Gadd-Claxton, Nkana Mine,
Northern Rhodesia

Application September 10, 1947, Serial No. 773,222
In Great Britain August 16, 1946

Section 1, Public Law 690, August 8, 1946
Patent expires August 16, 1966

10 Claims. (Cl. 6—12)

This invention relates to a device for the manufacture of honey combs.

One object of this invention is the provision of a device which enables the manufacture of complete honey combs all cells of which are symmetrically arranged and of equal depth.

It will be obvious that in accordance with the present invention artificial honey combs of substantially natural, or any other desired configuration can be produced.

A device for the manufacture of honey combs comprises, according to this invention, a series of electrically heatable formers which are parallel with and spaced from one another and are arranged in a preferably straight row; means for passing a solid slab of wax step by step above and across said series of formers; means for reciprocating said formers so as to impress them into and to withdraw them from such slab; and means for heating said formers. The formers are preferably secured to a former plate and said former plate is arranged to be reciprocated in the direction of the longitudinal extent of said formers.

The formers are provided with passages which are arranged to enable the molten wax to flow therethrough and which open into a wax collecting passage which is provided below or within the former plate but preferably between the former plate and a mounting plate to which said former plate is secured.

Means are provided for heating said collecting passage which is preferably inclined towards a discharge opening and which may be connected to a vacuum pump.

The means for reciprocating the formers preferably comprises a cam and plunger arrangement and the means for passing the slab step by step across the series of formers are synchronised with the means for reciprocating the formers. For example, said means for passing the slab may comprise a rack and a one-tooth pinion which latter is arranged to be driven by the cam shaft on which is seated the cam which brings about the reciprocating movement of the formers.

The means for passing the slab of wax are preferably so arranged with respect to the formers that said formers enter the wax surface at an inclination to said surface which deviates by about 15° from the perpendicular to said surface.

This invention also includes a former comprising a body made of heat-conducting material such as metal; said body being provided at its top end with a former head and at its bottom end with means for connecting it to a former plate and carrying a heater coil; said body being formed with a passage suitable for the passage of molten wax. The heater coil preferably surrounds a central part of the body which is, in plan, of greater area than the former head. The top surface of said central part is preferably formed with a collecting channel which, in plan, surrounds the former head and is connected with the body passage, and the former head is preferably replaceable and is connected to the former body as by a screw-connection.

In one form of this invention, a device as specified in any of the six last preceding paragraphs also comprises means for measuring the temperature of the formers, and means controlled by said temperature measuring means for stopping the operation of the device if the temperature of said formers falls below a predetermined temperature.

One form of a device according to this invention is illustrated by way of example in the appended drawings, in which:

Fig. 1 is a front elevation of the device with parts broken away.

Figure 3:
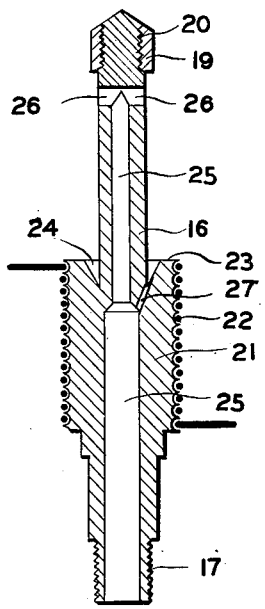
Fig. 3 is a section of a former shown on an enlarged scale.
Figure 2:
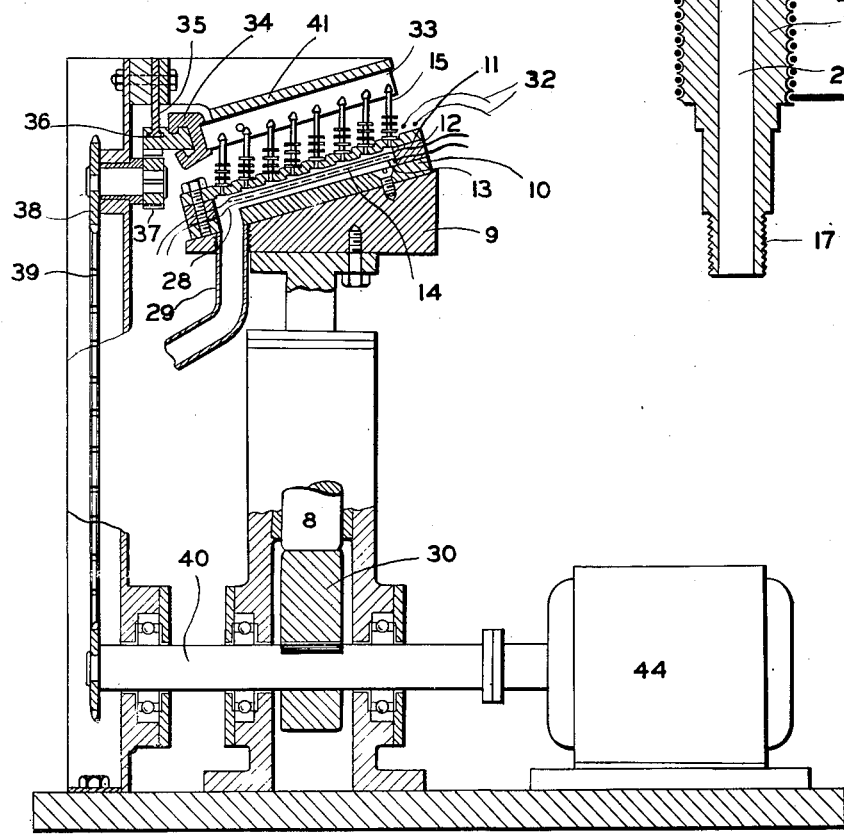
Fig. 2 is a sectional view along line II—II of Fig. 1 with parts broken away.

With reference to the figures, 1 indicates a base plate on which is mounted the body 2. Said body is formed with cylindrical bores provided with sleeves 3, 4 and 5 in which the guide pistons 6, 7 and the cam plunger 8 are arranged for reciprocatory movement. Said guide pistons 6, 7 and said cam plunger 8 support a wedge block 9 on which is mounted the mounting plate 10 which supports the former plate 11. Said former plate 11 is spaced from the mounting plate 10 by the rim sections 12 which inclose a wax collecting passage 13 between said two plates. 14 indicates a heater which is arranged to heat said passage 13 to a temperature exceeding the melting temperature of the wax.

Screwed into the former plate 11 are several formers which are generally indicated by 15 and one of which is shown on a larger scale in Fig. 3. As shown in this figure, a former comprises a body 16 which is screw-threaded at 17 for connection with the former plate 11, and which is provided at its top with a replaceable head 19 screwed to the body 16 at 20.

The body 16 has an enlarged central portion 21 which carries an electric heating coil 22. The top surface 23 of said central body portion 21 is formed with a collecting channel 24. The former body 16 is provided with a central bore 25 which has lateral openings at 26, 26 and which is connected at 27 to said collecting channel 24. At its bottom, the bore 25 opens into the collecting passage 13 when the former 15 is screwed into the former plate 11.

Said passage 13 is inclined towards a discharge opening 28 to which is connected to a discharge pipe 29 leading to a collecting vessel (not shown) which latter may be connected to a vacuum pump.

The formers 15 are reciprocated by the cam plunger 8 which is operated by the cam 30 against which it is being pressed by the compression spring 31.

32 indicates the bus bar connections to the formers 15.

The means for passing a wax slab 33 step by step across the line of formers 15 comprises a wax support bar 34 which grips the wax slab 33 and which slides along the supporting T-bar 35 and is attached to a rack 36. The rack 36 is driven by a one-tooth pinion 37 through sprockets 38 and chain 39 from the same shaft 40 which drives the cam 30.

41 indicates a backing plate which is mounted above the formers 15 and prevents the wax slab 33 from bending when it is being acted upon by the formers.

The T-bar 35 is secured to the base plate 1 by supports 42 and 43.

The device is operated by a motor 44.

The device is operated as follows:

A slab 33 of preferably purified and sterilized wax is gripped in the wax support bar 34 so that the forward edge of said slab is in a suitable position with respect to the row of formers 15, and the formers 15 and the collecting passage 13 are heated to the required temperature by passing current through the coil 22 and the heater 14 respectively. The preferred temperature for the formers is 147° F. plus or minus 5%.

When the formers and the collecting passage are sufficiently hot, the driving motor 44 or other prime mover is started so that the shaft 40 begins to rotate. Said shaft drives the one-tooth pinion 37 which latter moves the rack 36 one space forward and thus brings the wax slab 33 into that position in which the first row of cells is to be produced. Continued rotation of shaft 40 drives the cam piston 8 upwards and thus forces the hot formers 15 into the wax slab 33. As the former heads 20 enter the slab, they melt the wax in their immediate surroundings and the molten wax is immediately removed through passages 25 and 13 and discharge pipe 29. The formers 15 are slowly pressed upwards until the formation of the cells is completed, and are then quickly withdrawn by the return movement of the cam plunger 8 which is brought about by the compression spring 31.

After the formers 15 have been withdrawn, the one-tooth pinion 37 moves the rack 36 one space forward and thus brings the wax slab 33 into the desired position for the formation of the next series of cells and starts the next cycle.

The device of this invention enables the manufacture of honey combs the cells of which are symmetrical and of even depth so that the decapping can be done more quickly and more efficiently. Also, the honey combs produced by this device can be made free of impurities and sterile and of greater strength than the natural honey combs.

I claim:

1. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab.

2. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, said formers being supported by a former plate disposed intermediate said formers and said plunger for reciprocating movement therewith.

3. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax in steps and to reciprocate said plunger for impressing said formers into and withdrawing them from said wax slab, each of said formers having an upper portion and an adjacent central portion of smaller and larger diameter.

respectively, a longitudinal bore extending centrally thereof to adjacent the upper end of the former, a bore extending transversely of the upper end of said longitudinal bore, a channel defined around the lower end of said upper portion by said central portion and a bore extending from said channel to said central bore.

4. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, said formers being supported by a former plate disposed intermediate said formers and said plunger for reciprocating movement therewith, each of said formers having an upper portion and an adjacent central portion of smaller and larger diameter, respectively, a longitudinal bore extending centrally thereof to adjacent the upper end of the former, a bore extending transversely of the upper end of said longitudinal bore, a channel defined around the lower end of said upper portion by said central portion and a bore extending from said channel to said central bore, said combination including also a wax collecting space extending below said former plate and defined by said former plate, a mounting plate and a rim section disposed therebetween, for collecting molten wax removed from the cell spaces produced by said formers.

5. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, each of said formers having an upper portion and an adjacent central portion of smaller and larger diameter, respectively, a longitudinal bore extending centrally thereof to adjacent the upper end of the former, a bore extending transversely of the upper end of said longitudinal bore, a channel defined around the lower end of said upper portion by said central portion and a bore extending from said channel to said central bore, and an electric heating element disposed circumferentially of the central portion thereof.

6. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, said gripping means being adapted to support said wax slab at an upwardly extending angle in a manner to permit said formers to enter said slab at an angle of substantially 15° from the perpendicular with respect to the wax surface.

7. Apparatus for the manufacture of honey combs from wax slabs, comprising, in combination a plurality of series of formers arranged in rows upon a movable support with their axes in parallel alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab.

8. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, said formers being supported by a former plate disposed intermediate said formers and said plunger for reciprocating movement therewith, and a mounting plate disposed below said former plate, and guide members extending downwardly from said mounting plate parallel to said plunger.

9. Apparatus for the manufacture of honey combs from wax slabs, comprising, in combination, at least one series of upwardly extending formers arranged in a row upon a movable support in parallel axial alignment, movable gripping means extending transversely of and adjacent to one end of said row of formers adapted to support a wax slab above said formers and including a rack, conveyor means including a one-tooth pinion having engagement with said rack and adapted to move said gripping means with said wax slab transversely of said row of formers, reciprocating means carrying said movable support and said formers and including a plunger and a cam adapted to impart reciprocating motion to said formers substantially at right angles to the movement of said gripping means, and a prime mover including a shaft operatively connected to said pinion and said cam adapted to rotate said pinion and said cam to alternately move said gripping means for advancing said wax slab in steps and to reciprocate said plunger for impressing said formers into and withdrawing them from said wax slab, said formers being supported by a former plate disposed intermediate said formers and said plunger for reciprocating movement therewith, each of said formers having an upper portion and an adjacent central portion of smaller and larger diameter, respectively, a longitudinal bore extending centrally thereof to adjacent the upper end of the former, a bore extending transversely of the upper end of said longitudinal bore, a channel defined around the lower end of said upper portion by said central portion and a bore extending from said channel to said central bore, said combination including also a wax collecting space extending below said former plate and defined by said former plate, a mounting plate and a rim section disposed therebetween, for collecting molten wax removed from the cell spaces produced by said formers, said mounting plate being disposed in an inclined position and having a discharge aperture adjacent the lower side thereof.

10. Apparatus for the manufacture of honey combs comprising, in combination, a plurality of formers rigidly supported by a former plate and extending therefrom in a row in parallel axial alignment; each of said formers having a central bore and bores extending from the outer surface of the former to said central bore and a circumferential heating element; a mounting plate disposed in inclined position adapted to support said former plate and defining a wax collecting chamber with said former plate; gripping means including a rack extending transversely of and adjacent to one end of said row of formers adapted to support a wax slab above said formers; conveyor means in operative engagement with said rack adapted by means of a one-tooth pinion to move said gripping means and said wax slab in steps transversely of the ends of said formers; reciprocating means including a plunger supporting said mounting plate and said formers, and a cam in engagement with said plunger adapted to move said formers into and from said wax slab at right angles to the direction of movement of said conveyor means; a shaft supporting said cam and operatively connected with said conveyor; and a prime mover for said shaft.

CLAUDE GADD-CLAXTON.

REFERENCES CITED

The following references are of record in the file of this patent:

UNITED STATES PATENTS

| Number | Name | Date |
| --- | --- | --- |
| 2,229,613 | Strauch | Jan. 21, 1941 |

FOREIGN PATENTS

| Number | Country | Date |
| --- | --- | --- |
| 1,428 | Switzerland | Oct. 9, 1889 |
| 4,141 | Great Britain | 1898 |
| 241,791 | Great Britain | Oct. 29, 1925 |
| 615,873 | Great Britain | Jan. 12, 1948 |